No. 706,742. Patented Aug. 12, 1902.
R. A. FESSENDEN.
WIRELESS SIGNALING.
(Application filed June 6, 1902.)

(No Model.) 5 Sheets—Sheet 1.

No. 706,742. Patented Aug. 12, 1902.
R. A. FESSENDEN.
WIRELESS SIGNALING.
(Application filed June 6, 1902.)
(No Model.) 5 Sheets—Sheet 2.
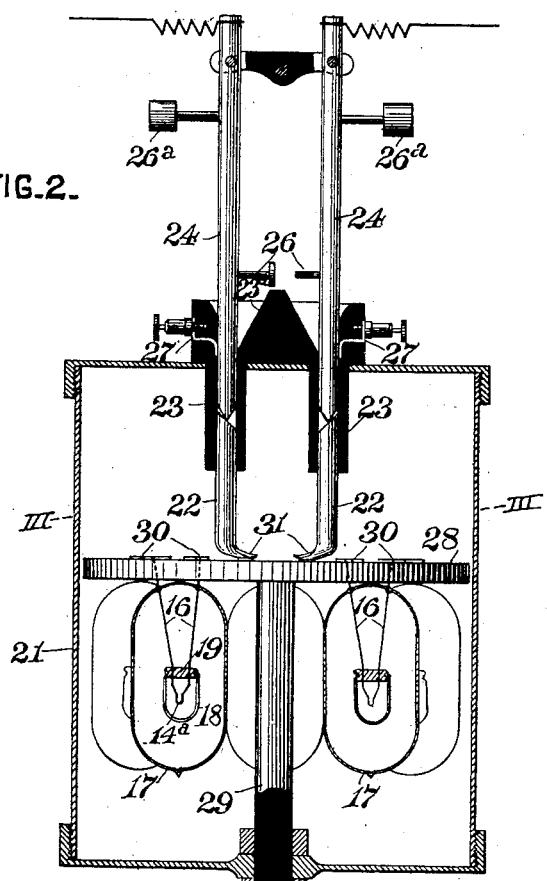
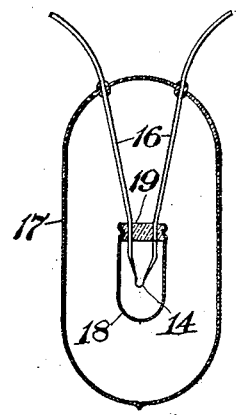
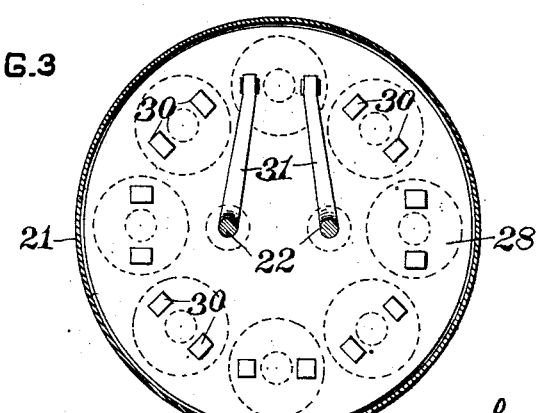

No. 706,742. Patented Aug. 12, 1902.
R. A. FESSENDEN.
WIRELESS SIGNALING.
(Application filed June 6, 1902.)
(No Model.) 5 Sheets—Sheet 3.

WITNESSES:
INVENTOR
Reginald A. Fessenden
by Darwin S. Wolcott
Att'y.

No. 706,742. Patented Aug. 12, 1902.
R. A. FESSENDEN.
WIRELESS SIGNALING.
(Application filed June 6, 1902.)
(No Model.) 5 Sheets—Sheet. 4.

WITNESSES:
INVENTOR
Reginald A. Fessenden
Att'y.

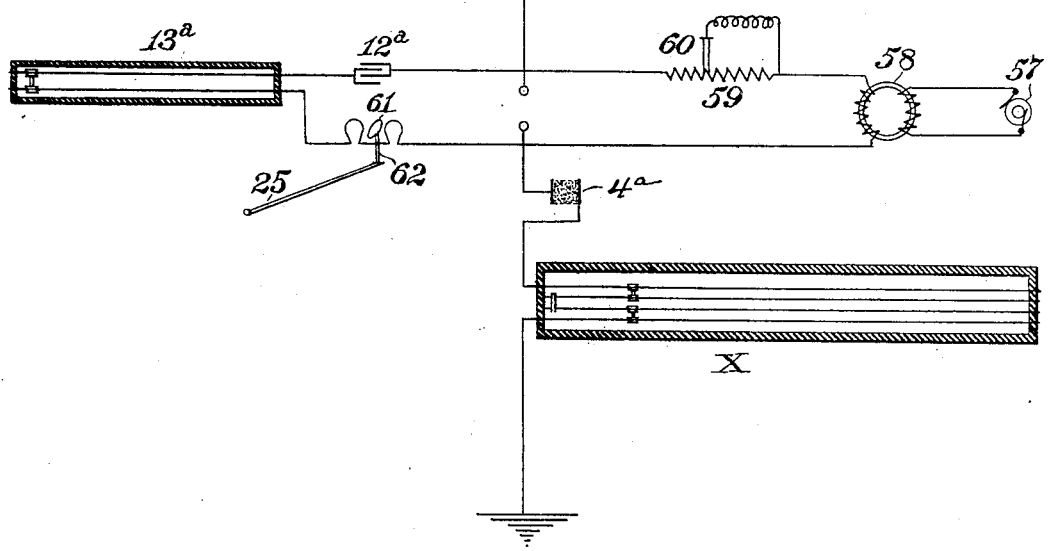

UNITED STATES PATENT OFFICE.

REGINALD A. FESSENDEN, OF MANTEO, NORTH CAROLINA.

WIRELESS SIGNALING.

SPECIFICATION forming part of Letters Patent No. 706,742, dated August 12, 1902.

Application filed June 6, 1902. Serial No. 110,460. (No model.)

*To all whom it may concern:*

Be it known that I, REGINALD A. FESSENDEN, a citizen of the United States, residing at Manteo, in the county of Dare and State of North Carolina, have invented or discovered certain new and useful Improvements in Wireless Signaling, of which improvements the following is a specification.

The invention described herein relates to certain improvements in signaling by electromagnetic waves, and has for its object a construction and arrangement of parts or elements whereby a rate of signaling higher than heretofore possible can be attained and over greater distances with much smaller expenditure of power than in any of the systems now in use.

It is a further object of the invention to render the operation of the receiving mechanisms so positive and reliable as to make possible the transmission of "code-messages" and other desirable classes of work.

The invention is hereinafter more fully described and claimed.

Figure 1:
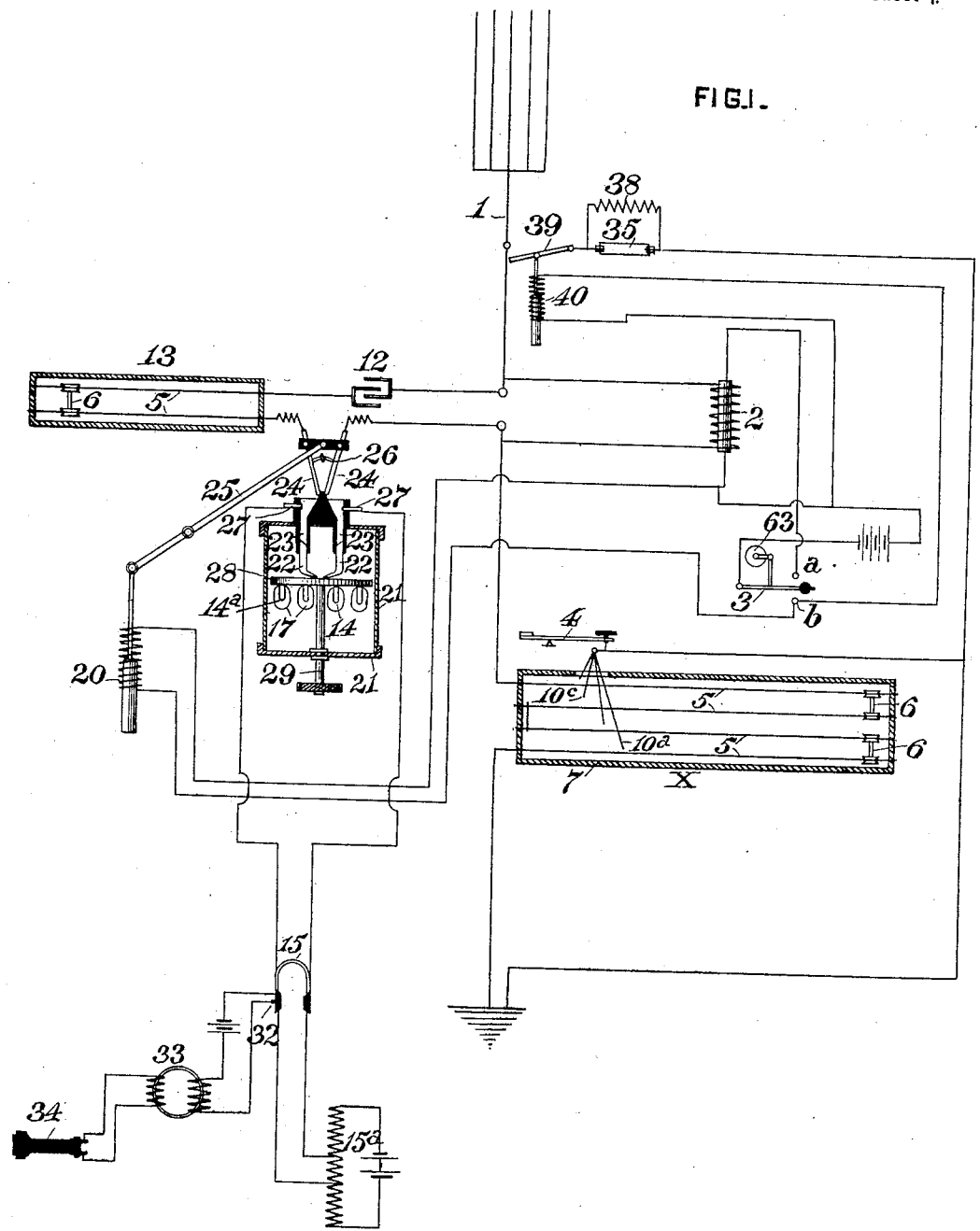
Figure 7:
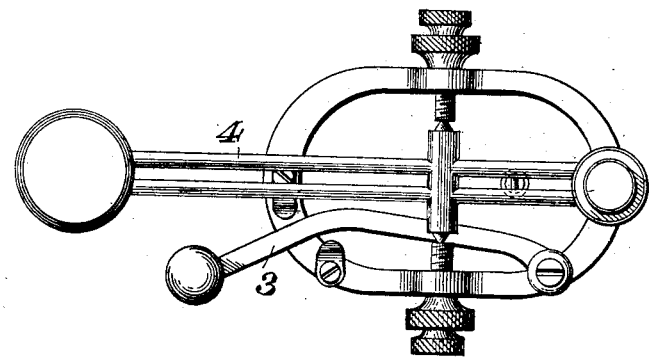
Figure 5:
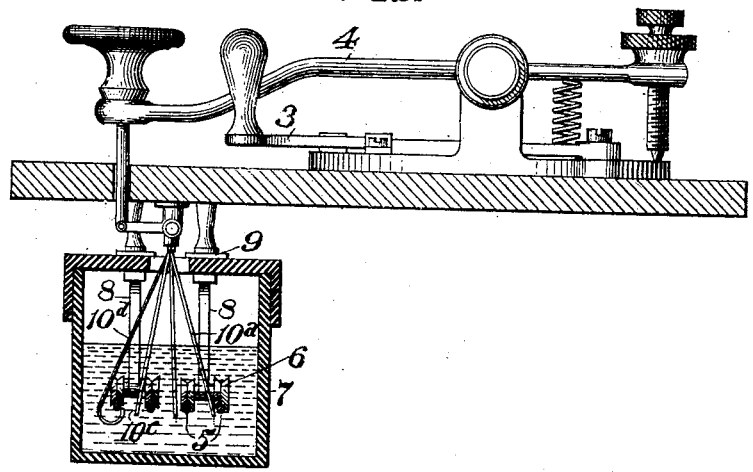
Figure 6:
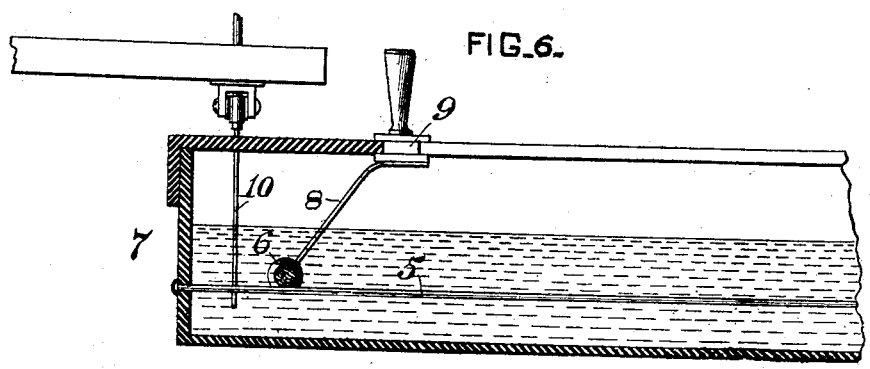
Figure 9:
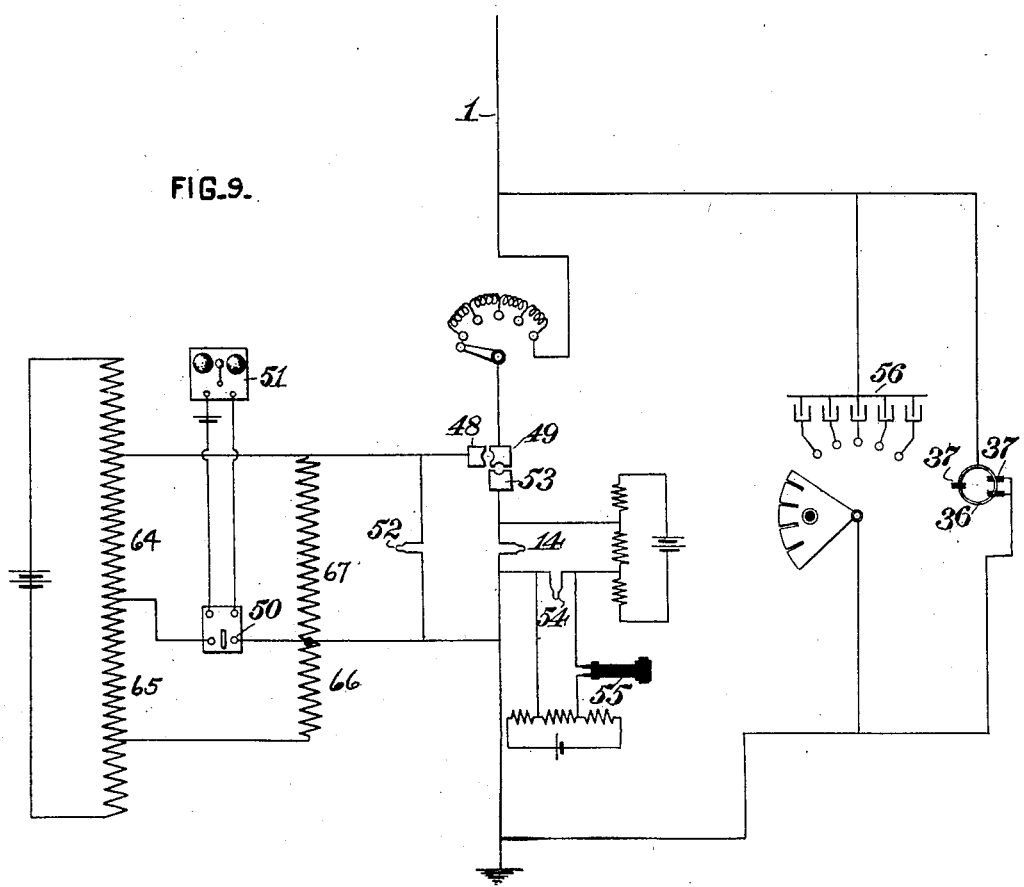
Figure 8:
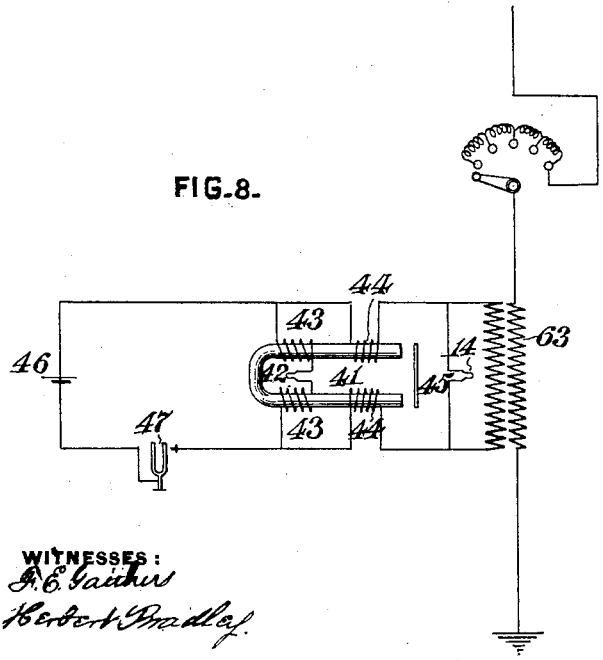

In the accompanying drawings, forming a part of this specification, Figure 1 is a diagrammatic view illustrating a form of sending and receiving apparatus. Fig. 2 is a sectional view, on an enlarged scale, of the receiver-box. Fig. 3 is a sectional view on a plane indicated by the line III III, Fig. 2. Fig. 4 is a sectional view of the receiver-bulb. Figs. 5 and 6 are sectional views, on an enlarged scale, of tuning and sending mechanisms. Fig. 7 is a plan view of sending devices and shifting-switch. Figs. 8 and 9 are diagrammatic views of modifications of the receiving system, and Fig. 10 is a diagrammatic view of a modification of the sending and receiving systems.

In the practice of my invention I employ at each station a conductor 1, of any suitable form or construction, connected to one of the terminals of an induction-coil 2 or other suitable voltage-generator, the other terminal of the generator being grounded. A switch 3 is arranged in the controlling-circuit of the generator, so as to permit of the generator being rendered inoperative when the apparatus is to be employed for receiving purposes. When sending, it is preferred that the generator—*e. g.*, an induction-coil—should be kept continuously in action; but the invention is not limited to such method of operation, as the ordinary method of sending by making and breaking the controlling-circuit of the generator can be employed. When the generator is in continuous operation, a key 4 is employed for throwing the sending-conductor out of tune with the station to which signals are being sent. This is effected not by making and breaking, but by short-circuiting, more or less, of the tuning device, which is arranged in series with the conductor 1 and preferably between the generator and ground. While any suitable form or construction of tuning mechanism may be employed, the construction shown in Figs. 1, 5, and 6 is preferred. This construction consists, primarily, of one or more connected pairs of parallel wires or strips 5, forming a tuning-grid, and one or more movable contacts 6, adapted to electrically connect the wires or conductors of each pair. These wires are preferably arranged in a box 7, containing sufficient oil to cover the wires to a depth of an inch, more or less. This construction permits of the proportioning of the capacity and self-inductance, so as to obtain a pure sine-wave, as is necessary to give good resonance. To obtain pure sine-waves, the ratio of capacity to inductance per unit of length should be the same as nearly as possible for all portions of the sending-conductor. In this respect my improved system differs sharply from systems involving the use of coils suited to attain the greatest inductance with a given amount of resistance. As it is preferred to employ a radiating-conductor having a large capacity—*i. e.*, one in which the ratio inductance capacity is smaller than in a conductor formed of a single plain wire—it is desirable to avoid the use of coils, which have comparatively large ratio inductance capacity, and also to avoid the use of straight wires, which have a larger ratio than the radiating-conductor having large capacity. Hence straight wires or strips bent back and forth so as to have little self-inductance per unit of length are used for tuning, and since the self-inductance cannot generally be made small enough without bringing the wires or conductors too close to each other they are immersed in oil, so as to make the capacity larger and so make the ratio inductance capacity the same as that of the radiating-conductor. The movable contacts 6, whereby the capacity and self-inductance are adjusted to effect the desired tuning, are preferably made in the form of bars having grooved wheels secured thereon. The bars are loosely mounted in spring-arms 8, which are secured to adjusting-blocks 9, mounted in slots in the cover of the box. The arms 8 are so constructed as to hold the grooved wheels firmly in contact with the wires or conductors 5.

While the sending of signals can be effected by making and breaking the sending-circuit, as has heretofore been the practice, it is preferred to operate the generator continuously and to form the signals by changing the capacity and self-inductance—i. e., by throwing the sending-circuit out of tune. This throwing out of tune can be effected by means of key 4, provided with a finger 10, arranged to be pressed into contact with one of the wires 5 by a movement of the key 4, which is connected to ground, so that when the finger is in contact with one of the wires a shunt-circuit is formed around a portion of the tuning-grid. This method of sending is peculiarly adapted to selective signaling, as by employing a series of fingers 10, arranged to be brought into contact with one or more of the wires or strips of the grid in succession, more or less of the capacity and self-inductance is shunted. In order to render the selection sharp, the points of contact of the fingers with the wires or strips should be separated a considerable distance. Hence the fingers are arranged so that each will make contact with a different leg of the tuning-grid and one in succession of the other, as shown in Figs. 1 and 5, thereby varying the operative length of the sending-circuit. As the fingers 10 make contact with the tuning-grid in succession, it is evident that a receiving-station can be tuned to any one of the lengths of the sending-circuit as determined by the point of contact of a finger with a leg of the grid, and in case such receiving-station is being interfered with the tuning of the receiving-conductor can be changed to correspond with that of a different operative length of the sending-circuit—as, for example, suppose station A is sending to station B. The latter can tune the receiving-conductor to any operative length of the sending-conductor, as determined by the point of contact of any finger with a leg of the grid—e. g., to the length of conductor as determined by finger $10^a$—and can then receive. If, while B is receiving, a third station, as C, having ascertained in some way the tune in use between A and B, should interfere and prevent B from receiving, B would merely adjust his receiving-conductor to another operative length of the sending-conductor at A—as, for example, the length determined by finger $10^c$. It will be observed that all of the fingers are brought into contact in succession with their respective legs of the grid on each depression or operation of the key, so that the resultant effects correspond to the successive operation of four independent sending-conductors of different operative length, and therefore differently tuned. As station C could not know what tune B had changed to and as it is practically impossible for C to find out all the tunes to which A is adjusted, it is practically impossible for C to prevent B from receiving his messages, more especially as B could signal A to change all his tunes as soon as he ascertained that C was interfering.

The receiving-circuit consists of the conductor 1, condenser 12, a combined capacity and inductance, as the tuning-grid 13, preferably of the construction herein described, a receiver 14, and the combined capacity and inductance, as the tuning device $x$. These several parts of the receiving-circuit are arranged in series with each other; but the condenser 12, combined capacity and inductance 13 are arranged in shunt to the spark-gap—i. e., in parallel to the sending-conductor—as clearly shown in Fig. 1. The indicating mechanism, which may be in the form of a single or double head telephone 15, forms a part of a circuit also including the receiver 14 and a low-voltage generator $15^a$ of any suitable construction—as, for example, two cells of slightly-different voltage so connected as to oppose each other. As the receiver must change from and back to normal condition for each signal received, it is necessary for rapid and distinct signaling that these changes should occur nearly instantaneously, dependent only upon the length of the signal—i. e., whether long or short. As signaling at the receiving-station is dependent upon currents produced by electromagnetic waves, the requirement above stated is best attained by the employment of a receiver having a small heat capacity—i. e., capable of being raised quickly an appreciable amount in temperature with a consequent increase in resistance by a small amount of heat—and in addition to its capability of rapid heating with small amount of heat the receiver should be capable of cooling rapidly. These conditions are attained by making the receiver of small volume, so as to be quickly heated by currents, and of short length, so as to lose its heat rapidly by conduction. To facilitate sharp tuning, as for selective signaling, the receiver should have low resistance. In making a receiver complying with the conditions stated a silver wire one-tenth (.1) of an inch in diameter and having a platinum core about three one-thousandths (.003) of an inch in diameter is used. This wire is drawn until the external diameter of the silver wire is about two one-thousandths (.002) of an inch in diameter, and hence the platinum wire is about six hundred thousandths (.00006) of an inch in diameter. A short piece of the wire thus prepared is fastened to the leading-in wires 16 and bent in the form of a loop. The tip of this loop is immersed in nitric acid to dissolve the silver from the tip and leave a small portion of the loop free from silver, as shown in Fig. 4. It is essential that only a short length of the silver coating be dissolved, as if the exposed platinum portion be long its heat capacity will be too large and it will have too high a resistance to be available for selective signaling. In practice I prefer a length of a few hundredths of an inch, and thereby obtain a loop having a resistance of approximately thirty ohms, and hence of low resistance compared with the resistance of a coherer, though good results are obtained from loops proportioned to have a resistance as high as one hundred and fifty ohms, and some results are obtained with loops proportioned to have a resistance as high as six hundred ohms. The leading-in wires are of platinum and are sealed into a glass bulb 17, containing air or paraffin about one-half an inch in diameter and about one inch long, as shown in Fig. 4. This bulb may be exhausted of air with a very considerable increase in sensitiveness of the receiver. I prefer to do this, especially when the loop is used for a calling mechanism, as in this way less energy is required to produce a good effect. As a further means of avoiding the radiation of heat I inclose the loop in a very small silver shell 18, the shell being slipped over the loop and clamped to a small glass brace 19 on the leading-in wires corrugated for this purpose. The sensitiveness of the loop may be increased if only a portion of the silver coating be removed, so as to produce a composite conductor of half the resistance which the exposed platinum would have. This end can be best attained by dissolving off all the silver and then recoating the platinum until the composite loop has half the resistance of the uncoated loop. Under these conditions equal currents pass through the platinum core and the renewed silver coating, and as the silver has equal resistance and one-seventh of the volume of the platinum it is heated approximately seven times as hot, and thus a greater total change of resistance is obtained with the composite loop than with a plain one. While preferring platinum and silver, other metals may be employed—as, for example, nickel or iron may be substituted for platinum and gold or aluminium for silver.

While the receiver 14 may be connected in the receiving-circuit in any suitable manner, it is preferred to employ a switch for that purpose, so that the receiver may be cut out while the sending mechanism is being operated. When cutting out the receiver, this circuit or the portion of circuit including condenser 12 and tuning device 13 should be closed around the receiver, so that it will become a circuit in parallel to the sending-conductor while sending. For convenience in operation it is preferred to provide for the simultaneous placing of the sending mechanism into and the receiving mechanism out of operative relation with conductor 1, and vice versa. A convenient means to this end consists in providing two contacts, as *a* and *b*, for the switch-lever 3, as shown in Fig. 1, said parts being so arranged that when the lever is in one position the generator will be placed in operative relation to the conductor 1, but when shifted a circuit, including a motor 20, such as a solenoid, will be closed. By the operation of the motor a make-and-break mechanism will be closed, so as to place the receiver 14 in series or operative relation with the receiving-circuit. As the receiver is extremely delicate, it is preferred to protect it from extraneous electrical disturbances by a metal case 21, the leading-in wires of the bulb having connections extending out of the case through sleeves formed of insulating material. It is preferred that the leading-in wires 16 should be connected to rods 22, fixed in the insulating-sleeves 23, and that movable rods 24 should extend down into the sleeves and make contact with the rods 22. This arrangement forms the switch whereby the receiver is cut out of the receiving-circuit, the rods 24 being connected to a lever 25, operated by the motor 20. In order to close the circuit including the condenser 12 and tuning device 13 around the receiver, thereby transforming it into a circuit parallel with the sending-circuit, contacts 26 are carried by the rods 24, which are adapted to be swung in toward each other by weights 26ª or other suitable means when drawn out of the sleeve, and thereby bringing the contacts 26 together immediately after the rods 24 are moved out of contact with the rods 23. It is preferred to disconnect the receiver from the circuit containing or controlling the indicating mechanism at the same time that the receiver is disconnected from the receiving circuit, and to this end terminals 27 of the indicating-circuit are arranged so as to contact with the rods 24 when the latter are in contact with the rods 22, as shown in Fig. 2. The rods 24 are separated and guided back into the sleeves 23 by means of a conical block 23ª, formed of insulating material.

As it is preferred to employ different receivers for calling and receiving and as a receiver might be destroyed while receiving a message, it is preferred to support the bulbs on a movable disk or plate 28 with the case or shell 21 preferably formed of insulating material, as rubber. This disk is supported by a rod 29, extending out of the case and provided with an operating-handle. The leading-in wires 16 are connected to contact-plates 30 on the disk, and the rods 22 are provided with spring-fingers 31, adapted to bear upon the contact-plates 30 when the disk is shifted. By this construction the calling-receiver can be quickly substituted for the regular receiver, and vice versa, and a new receiver substituted for one which has become inoperative from any cause, and, further, the receivers carried by the disk can be made of different degrees of sensitiveness, so that when communicating with stations different distances away receivers adapted to such distances can be brought into operation. As a call is effected by a close succession of sparks to produce a prolonged signal at the receiving-station, the call-receiver is preferably made less sensitive—i. e., responds less rapidly to variations in currents. To this end the loop 14ª is made a little longer and a little thicker, as shown in Figs. 1 and 2, so as to retain the heat longer, whereby the effect is rendered cumulative and the call mechanism, which may be a telephone, a galvanometer—preferably a ballistic galvanometer—a bell, or other suitable device, put in operation. Indications may be rendered more distinct by operating a michrophonic contact in the signaling-circuit and controlling an auxiliary indicating-circuit by such contact—as, for example, in Fig. 1 a microphonic contact 32, included in the primary circuit of a transformer 33, is arranged so as to be affected by the diaphragm of the telephone in the signaling-circuit, and an indicating mechanism 34, such as a telephone, is included in the secondary circuit of the transformer.

In practice the switch 3, whereby the sending and receiving mechanisms are put into and out of operative relation with the conductor 1, should be arranged closely adjacent to the sending device or key 4, as shown in Figs. 5 and 7, so that the operator can quickly change from receiving to sending, or vice versa. The tuning mechanisms should also by preference be arranged in convenient proximity to each other and to the sending-key 4, so that change from the tune or resonance for one station to that for another can be easily and quickly effected; but care should be taken that the tuning mechanisms shall be arranged so as to have no inductive effect one upon the other.

As a protection against electrical disturbances when receiving, I use a Varley lightning-arrester 35—i. e., a tube such as described by Varley in 1870—containing a mass of filings which are normally non-conducting, but which on being raised to a higher potential than usual become conducting and allow the discharge to pass to ground. As suggested by Varley, this may be tapped back again to restore the non-conductive state. Preferably for the Varley arrester I prefer to use filings formed from an alloy of gold and bismuth containing five per cent. bismuth placed in a small tube of about one-eighth of an inch internal diameter and lying between the conductors tipped with platinum-iridium alloy. I have found that the usual form of coherer or Varley arrester is not sufficiently sensitive, requiring approximately ten thousand times the energy to operate it that is required to operate the loop-receiver herein described, and hence the loop-receiver will burn out before the Varley arrester as usually constructed will operate. I have found that for most purposes the gold-bismuth coherer is sufficiently sensitive to be used except where very sensitive loop-receivers are employed. In lieu of a coherer-tube a small ring or disk 36, formed of aluminium or silver and resting on knife-edges 37, formed of gold-bismuth alloy, may be used, as shown in Fig. 9. The ring is connected to the conductor 1 and two of the knife-edges to ground. The ring is displaced after each coherence by any suitable means. As a further protection against lightning a shunt-circuit containing an inductance 38 is placed across the receiver and tuning-conductors, so as to permit any static charge which may accumulate on the wire to leak to ground, as shown in Fig. 1. When the Varley or other form of coherer is employed as a lightning-arrester, provision should be made to disconnect it from the conductor when sending. This may be conveniently done, in the manner shown in Fig. 1, by a switch 39, operated by solenoid 40 in a circuit controlled by switch 3. When a high frequency generator is employed, it is not necessary to cut out the shunt-circuit containing the inductance 38. As a still further protection against atmospheric electricity or other extraneous electrical disturbances, and one especially adapted for use in connection with very sensitive loop-receivers, I employ, preferably, the plan of circuits shown in Fig. 1, in which there are two distinct circuits—i. e., the main circuit and the auxiliary circuit. Each of these circuits is tuned to the other and to the station with which it is desired to communicate. When sending, the two circuits operate in parallel, as described in previous application, Serial No. 740,429, but when receiving the air-gap (or, when an air-gap is not used, the terminals of the source of voltage) is not bridged and the circuits now operate in series. With this connection the condenser 12 acts to insulate the receiver from any extraneous electrical disturbances, as a steady flow of static electricity from the wire, since this cannot flow through the condenser and injure the receiver, while at the same time it permits currents tuned to the proper periodicity to flow unchecked and to affect the receiver in the desired manner. This plan of circuits has the additional advantage that it avoids the necessity of bridging the spark-gap or the terminals of the source of voltage when it is desired to change from sending to receiving. It is essential for the practical operation of my system that this change be made easily and quickly, as otherwise if the spark-gap has to be bridged and a number of other connections made and unmade it is practically impossible for the receiving operator to cut in in case of failure to receive a word or words, as is necessary in a practically operative system without consuming too much time. By the above-mentioned plan of circuits, however, it is not necessary to bridge the spark-gap, and only one motion is necessary in charging from sending to receiving. As a protection against extraneous disturbances it is inadvisable to use coils for tuning on account of the fact that they tend to concentrate the self-inductance at localized points and to give rise to periodicities other than the fundamental, as mentioned above. Hence on account of the reciprocal relationship between radiation and absorption coils cause the absorption or receipt of frequencies other than the fundamental, and hence are apt to cause the destruction of the receiver by increasing the chance of the receipt of extraneous electrical disturbances. It is therefore preferred to employ the construction described in connection with the sending apparatus in which the tuning-conductors are arranged so as to have less self-inductance than the same length of straight wires instead of having more, as is the case of coils. As the capacity, if small, would also tend to introduce a vibration different from the fundamental, it is preferred to make it large.

A desirable form of receiving system for some purposes is shown in Fig. 8, where the loop 14 is in series in the secondary circuit and a differentially-wound indicating mechanism, as a differentially-wound telephone 41, is in shunt across the receiver. A resistance 42, preferably formed by a loop similar to the receiver 14, is arranged in one of the circuits of the differential instrument, the receiver 14 being in the other circuit, so that the circuits are balanced. Coils 43 and 44 are oppositely wound, and the two circuits being balanced there is normally no appreciable effect on the diaphragm 45. The source of voltage 46 and tuning-fork 47 are used to produce intermittent currents in the differential circuits, and, as mentioned above, there is normally no effect. When an electromagnetic wave causes a current to pass through the loop 14, thereby raising its resistance, the current in circuits containing the coils 44 of the differential instrument is weakened and the circuits being out of balance an indication is produced by the instrument. When it is not desired to use an intermittent current, the circuit including the generator is made continuous, as by wedging the prongs of the tuning-fork or in any other suitable manner.

A third alternative system or arrangement, more especially for use as a call, is shown in Fig. 9, whereby inserting a plug between the plates 48 49 an ordinary relay 50 is connected in what, as will be readily understood, is a form of Wheatstone bridge, and by its action actuates the bell 51, being itself controlled by its loop 52. Three arms of this bridge are formed by resistances 64, 65, and 66, and the fourth arm by resistance 67 and loop 52 in parallel.

A form of receiving mechanism whereby an intensified effect is obtained is also shown in Fig. 9. On the plug being placed between the plates 49 and 53 the currents produced by electromagnetic waves heat the loop 14, increasing its resistance, thus decreasing the current in a circuit including the receiver 14 and a second loop 54. The resistance of the loop 54 is thus decreased, thereby operating the signaling-circuit containing the telephone 55 or other indicator and giving an intensified effect.

It will be readily understood by those skilled in the art that a rupture of the receiver 14 will produce a change of the indicating mechanism from normal position, and this change may be made use of to automatically notify the operator that the apparatus is out of order—e.g., by ringing a bell in the system shown in Fig. 9 or by giving a loud note in the system shown in Fig. 8. The condenser 56 (shown shunted across the receiver 14 in Fig. 9) is the same arrangement and for the same purpose as in applications Serial Nos. 84,097 and 740,429.

As shown in Fig. 10, a continuous-current dynamo or an alternating-current dynamo 57 with a transformer 58 may be employed as the generator. When using such form of generator, a high resistance 59, preferably having a low inductance, is in series in the sending-circuit. Any suitable means, as a plug 60, for shunting a part of the resistance is preferably employed for cutting out more or less of the resistance. In operation the dynamo charges the condenser $12^a$ in the circuit in parallel with the receiving-circuit, and when the potential has risen sufficiently a discharge across the spark-gap will occur, discharging the condenser and setting up oscillations in the sending-conductor. On account of the high resistance 59 some time is required to recharge the condenser to sparking potential. Hence the discharge is intermittent and may be made to occur as many times per second as desired by plugging out more or less of the resistance and give any desired note. When using this sending system, the receiving mechanism may be tuned mechanically to respond to one or more given notes, as in Gray's harmonic-telegraph system and other mechanically-tuned instruments.

As shown in Fig. 10, a ring-receiver 61, such as is described and claimed in applications Serial Nos. 740,429 and 84,097, may be used in lieu of the loop-receiver, and such receiving mechanism or other construction capable of mechanical tuning is preferably employed in connection with the sending system shown in Fig. 10. In order to put the ring-receiver out of operation when sending, the ring is locked or shifted to neutral position by means of a pin 62, which in practical operation would be connected to the lever 25, (shown in Fig. 1,) so that the receiving-circuit can be made operative at the same time that the sending-circuit is rendered inoperative.

As shown in Fig. 10, a telephonic transmit-

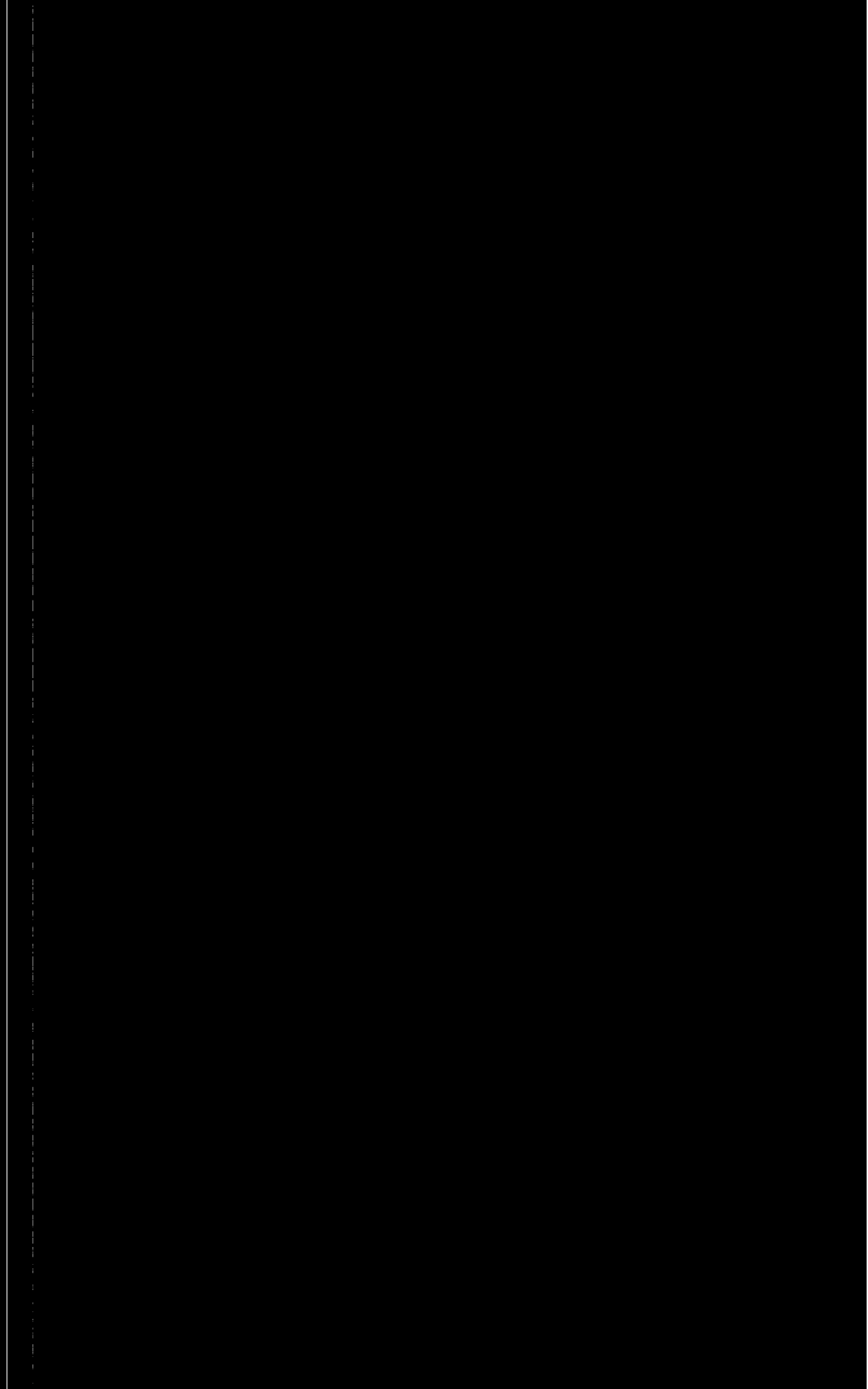

I claim herein as my invention—

1. In a system for signaling, &c., by electromagnetic waves, the combination of a conductor adapted to radiate and receive electromagnetic waves, mechanism for causing the radiation of electromagnetic waves from said conductor, means for modifying one or more of the characteristics of said waves, a receiving mechanism controlled by currents produced in said conductor by electromagnetic waves, and means for bringing said conductor into operative relation with either the generating or the receiving mechanism, substantially as set forth.

2. In a system for signaling, &c., by electromagnetic waves, the combination of a conductor adapted to radiate and receive electromagnetic waves, mechanism for causing the radiation of electromagnetic waves from said conductor, a receiving mechanism controlled by currents produced in said conductor by electromagnetic waves, and means for bringing said conductor into operative relation with either the generating or the receiving mechanism, substantially as set forth.

3. In a system for signaling, &c., by electromagnetic waves, the combination of a conductor adapted to radiate and receive electromagnetic waves, mechanism for causing the radiation of electromagnetic waves from said conductor, a receiving mechanism controlled by currents produced in said conductor by electromagnetic waves, and electrically-operated means for bringing said conductor into operative relation with either the generating or the receiving mechanism, substantially as set forth.

4. In a system for signaling, &c., by electromagnetic waves, the combination of a conductor adapted to radiate and receive electromagnetic waves, mechanism for causing the radiation of electromagnetic waves from said conductor, means for modifying step by step one or more of the characteristics of said waves, a receiving mechanism controlled by currents produced in said conductor by electromagnetic waves, and means for bringing said conductor into operative relation with either the generating or the receiving mechanism, substantially as set forth.

5. In a system for signaling, &c., by electromagnetic waves, the combination of a conductor adapted to radiate electromagnetic waves, means for causing the radiation of electromagnetic waves from said conductor and means for modifying one or more of the characteristics of said waves, substantially as set forth.

6. In a system for signaling, &c., by electromagnetic waves, the combination of a conductor adapted to radiate electromagnetic waves, means for causing the radiation of electromagnetic waves from said conductor and means for modifying step by step one or more of the characteristics of said waves, substantially as set forth.

7. In a system of signaling by electromagnetic waves, a tuning device having one or more conductors arranged for tuning and constructed so as to have small inductance as compared with that of a coil containing an equal length of the conductor for the purpose of preventing the inductance from prolonging the oscillations of the sending-circuit and hence cutting down the radiation per oscillation, substantially as set forth.

8. In a system of signaling by electromagnetic waves, a tuning device having one or more conductors arranged for tuning and so adjusted as to have the same ratio of inductance to capacity per unit of length that the radiating conductor has, as distinguished from tuning devices having conductors so formed as to have maximum inductance, substantially as set forth.

9. In a system of signaling by electromagnetic waves, the combination of a conductor and a spark-gap with means for changing the function of the conductor, i. e., from sending to receiving without bridging or disconnecting the spark-gap, substantially as set forth.

10. In a system of signaling by electromagnetic waves, the combination of a radiating conductor, a spark-gap, a capacity and a source of voltage with a high resistance, whereby an intermittent discharge across the spark-gap may be produced, substantially as set forth.

11. In a system of signaling by electromagnetic waves, the combination of a radiating conductor, a spark-gap, one terminal of the spark-gap being connected to ground, a capacity and a source of voltage with a high resistance, whereby an intermittent discharge across the spark-gap may be produced, substantially as set forth.

12. In a system of signaling by electromagnetic waves, the combination of a radiating conductor and a spark-gap, one terminal of the spark-gap being connected to ground, with means for changing the function of the conductor, i. e., from sending to receiving without bridging the spark-gap, substantially as set forth.

13. In a system of signaling by electromagnetic waves, the combination of a radiating conductor, a spark-gap, a capacity and a source of voltage with a high resistance, and means for varying said resistance, whereby any desired number of discharges per second across the spark-gap may be produced, substantially as set forth.

14. In a system of signaling by electromagnetic waves, the combination of a wave-responsive device, an indicating mechanism and means for operating the indicating mechanism when the wave-responsive device becomes inoperative while in operative connection, substantially as set forth.

15. In a system of signaling by electromagnetic waves, the combination of a receiver, an indicating mechanism, and means for operating the indicating mechanism when the receiver is ruptured, substantially as set forth.

16. In a system of signaling by electromagnetic waves, the combination of a receiving-circuit, a series of receivers, and means shifting any desired one of said receivers into and out of operative relation to the receiving-conductor, substantially as set forth.

17. A system for signaling by electromagnetic waves, the combination of a receiver, rods movable into and out of contact with the terminals of the receiver, contacts adapted to be brought into contact by the rods when shifted out of contact with the receiver-terminals, substantially as set forth.

18. A system for signaling by electromagnetic waves, in combination therewith, a tuning device consisting of one or more connected pairs of conductors and one or more contact-pieces connecting the legs of each pair movable along the same, substantially as set forth.

19. A system of signaling by electromagnetic waves, having in combination one or more connected pairs of connected conductors in series in the sending-circuit and contact-fingers adapted to bear against the conductors in succession, thereby shunting different portions of the sending-conductor, substantially as set forth.

20. A system of signaling by electromagnetic waves, having in combination a sending-conductor and a key provided with fingers arranged to be brought into contact with the sending-conductor at different points, substantially as set forth.

21. A system of signaling by electromagnetic waves, having in combination a sending-conductor and a key provided with fingers adapted to be brought into contact in succession with the sending-conductor at different points, substantially as set forth.

22. A system of signaling by electromagnetic waves, having in combination therewith mechanism for the production of the proper signal of a station at that station, as means for indicating the busy or free state of that station, substantially as set forth.

23. A system of signaling by electromagnetic waves, having in combination therewith automatic mechanism for the production of the proper signal of a station at that station, as means for indicating the busy or free state of that station, substantially as set forth.

24. A system of signaling by electromagnetic waves, having in combination a sending-conductor and a normally closed shunt, said parts being so arranged that the sending-conductor will have the natural period proper to that station, substantially as set forth.

25. A system of signaling by electromagnetic waves, having in combination a sending-conductor, a sending-key forming part of a shunt for said conductor and provided with a finger normally in contact with the conductor so that said conductor will normally have the natural period proper to that station, substantially as set forth.

26. A system of signaling by electromagnetic waves having in combination therewith means for indicating to a third station during sending or receiving that such sending or receiving station is busy, substantially as set forth.

27. In a system of signaling by electromagnetic waves, the combination of radiating-conductor and a gap, one terminal of the gap being connected to ground, with means for changing the function of the conductor, i. e., from sending to receiving, without bridging the gap, substantially as set forth.

28. In a system of signaling by electromagnetic waves, a sending-conductor, a receiving-conductor, a transformer connected in operative relation to the receiving-conductor, in combination with a current-actuated wave-responsive device (in the secondary circuit of the transformer,) the secondary circuit, receiving-conductor and sending-conductor all being tuned to the same periodicity.

29. A system for signaling by electromagnetic waves having in combination therewith an aerial conductor, a tuning device for said system including a pair of conductors constructed and arranged to inductance and capacity in substantially the same ratio as the aerial conductor, and means for varying the operative length of the pair of conductors, substantially as set forth.

In testimony whereof I have hereunto set my hand.

REGINALD A. FESSENDEN.

Witnesses:
DARWIN S. WOLCOTT,
F. E. GAITHER.